United States Patent [19]

Densmore

[11] Patent Number: 4,667,813
[45] Date of Patent: May 26, 1987

[54] CONVEYOR BELT CHAIN

[75] Inventor: Neal W. Densmore, Franklin, Pa.

[73] Assignee: Joy Manufacturing Company, Pittsburgh, Pa.

[21] Appl. No.: 346,683

[22] Filed: Feb. 8, 1982

[51] Int. Cl.$^4$ .................................................. B65G 15/30
[52] U.S. Cl. ................................................... 198/846
[58] Field of Search ............... 198/834, 849, 844, 830, 198/853, 731, 712, 831, 852, 846

[56] References Cited

U.S. PATENT DOCUMENTS

| 1,016,190 | 1/1912 | White | 198/731 |
|---|---|---|---|
| 1,028,893 | 6/1912 | Luther | 198/851 |
| 1,473,258 | 11/1923 | Steedsman et al. | 198/712 |
| 2,443,947 | 6/1948 | Brooks et al. | 198/850 |
| 2,759,595 | 8/1956 | Lavenstein | 198/830 |
| 3,209,897 | 10/1955 | Rice | 198/850 |
| 3,595,380 | 7/1971 | Miller | 198/834 |
| 4,282,971 | 8/1981 | Becker | 198/834 |

Primary Examiner—Joseph E. Valenza
Attorney, Agent, or Firm—Raymond W. Augustin

[57] ABSTRACT

An improved chain for use as a tension element in conjunction with a resiliently deformable conveyor belt which permits the belt to be prestretched at installation by a predetermined, controlled and limited amount.

7 Claims, 5 Drawing Figures

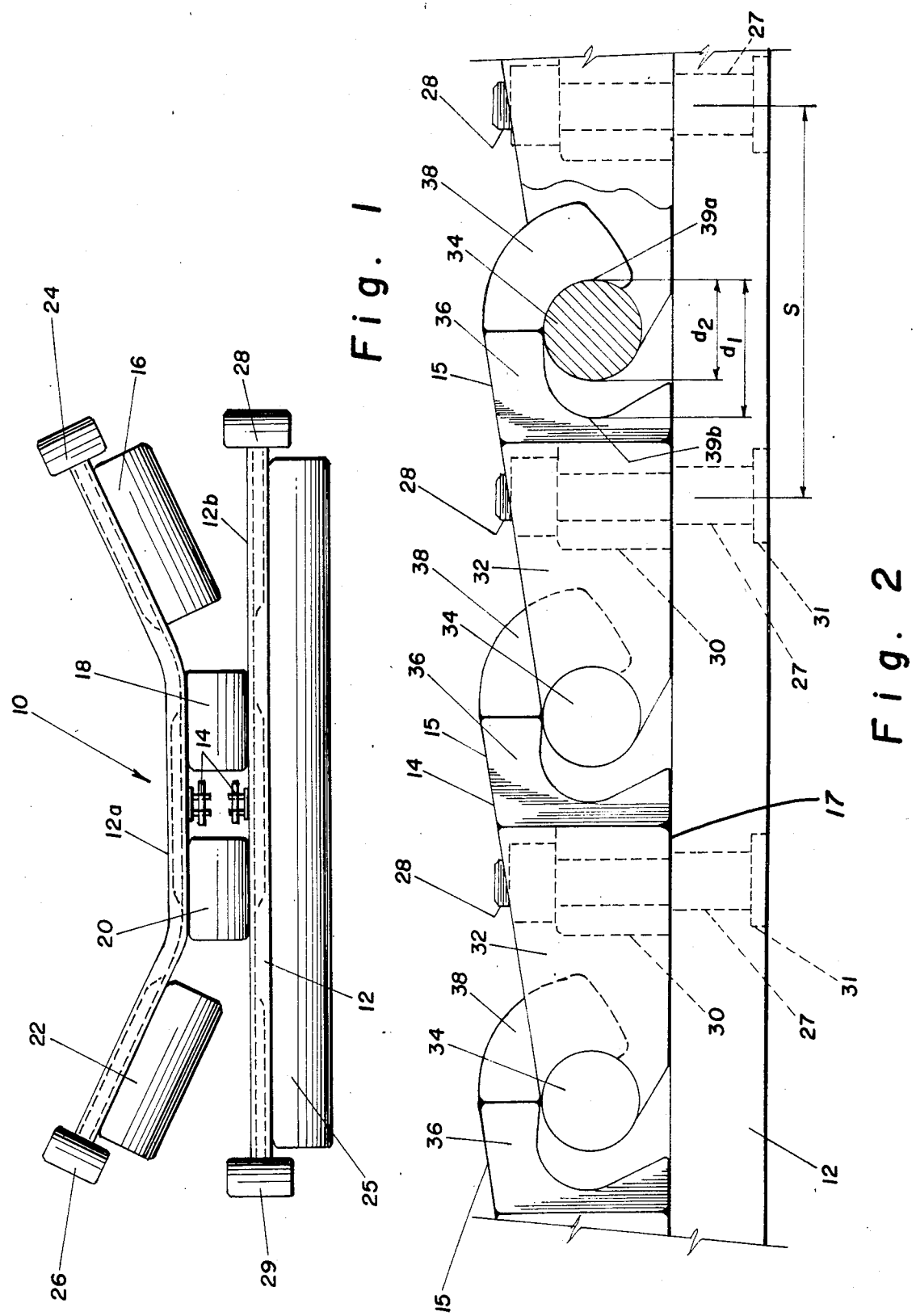

CONVEYOR BELT CHAIN

This application is a continuation of application Ser. No. 116,722, filed 1-30-80 now abandoned.

BACKGROUND OF THE INVENTION

This invention relates to conveyor elements for the transport of bulk materials such as coal and the like, and which may often include a belt having a U-shaped upper reach that defines an elongated pocket which is able to negotiate turns in a horizontal direction during traverse of an elongated, generally curvilinear conveying run. Prior conveyor elements of this type have employed such means as centrally located cables to carry the required driving tension, and the belt structure has often included a web of resiliently deformable material which is able to accommodate elongation or shortening of the belt, and particularly of the belt edges, in horizontal turns whereby the problem of belt edge collapse in horizontal turns has been alleviated. For example, molded edge flutes have been employed in such belts to fold or unfold as required in horizontal turns.

In copending application Ser. No. 06/069,664 of Merle L. Hoover, filed Aug. 24, 1979, which is now abandoned and continued as U.S. application Ser. No. 224,419, filed on Jan. 12, 1981 which will issue into U.S. Pat. No. 4,387,801 on June 14, 1983, is assigned to the same assignee as is the instant invention and the entire specification of which is incorporated herein by reference, a conveyor element is disclosed which negotiates horizontal turns without collapse of the belt edges by virtue of a limited prestretch imposed on the belt at installation thereof in the conveyor support structure such that the belt edges remain in longitudinal tension when the belt passes through horizontal turns. In one embodiment thereof the prestretching of this belt is achieved by riveting or otherwise fastening the resiliently deformable belt to a chain which has a predetermined freeplay in the link connections to permit the chain to elongate and thereby prestretch the belt. That is, when the chain is attached to the conveyor belt during assembly, the chain links are in effect pushed together such that upon installation of the chain and belt assembly in the support structure the belt may be resiliently stretched to the extent permitted by the loose pin connections of the chain links to impose a predetermined prestretch over and above the relaxed or unstretched length of the belt.

In U.S. Pat. No. 4,282,971 of Henry R. Becker, issued Aug. 11, 1981 which is assigned to the same assignee as is the instant invention and the specification of which is incorporated herein by reference, an expansible chain for conveyor belts is disclosed which is formed of alternate links, one being a C-shaped link secured to a conveyor belt and the other being a floating H-shaped connecting link which connects adjacent C-links together but is not itself directly secured to the belt, and which is adapted to be engaged by a drive sprocket. The structure of the H- and C-links is such as to permit a limited free play in the connections therebetween such that the links may be loosely fitted together upon assembly thereof to a resiliently deformable belt and thus upon installation of the belt in its support structure the chain will permit a limited and predeterminable prestretching of the belt to the limit of chain expansion as hereinabove described.

SUMMARY OF THE INVENTION

In accordance with the present invention an improved expansible tension chain for a conveying element is disclosed which, in its preferred embodiment, is formed of substantially identical and mutually cooperable links secured together end to end. The links of the improved chain may be secured to a resiliently deformable conveyor belt whereby the chain is able to serve as a conveyor belt tension element. Accordingly, the improved chain includes lug means for drivingly engaging a drive sprocket to carry the driving tension applied to the conveyor element. Additionally, the improved chain is capable of providing a predetermined and limited prestretching of the belt upon installation of the chain and belt assembly on the belt support structure, owing to a limited free play between the chain link connections. The free play in the chain also permits the chain to be utilized in conjunction with a novel drive sprocket to render a reduction in chain pitch length as the chain passes over the drive sprocket. This serves to somewhat relax the prestretch in the belt or to limit incremental increases in belt stretching as the belt passes over the terminal drum associated with the drive sprocket. One such sprocket is disclosed in application Ser. No. 06/080,851 of Neal W. Densmore, et al., filed Oct. 1, 1979 and assigned to the same assignee as is the instant invention. The improved chain further is capable of readily negotiating horizontal turns. Advantages of the present invention over prior chains include elimination of the so-called floating links which are not connected directly to the belt, and the economy of substantially identical chain links as compared with such alternatives as the hereinabove described alternating H- and C-links.

These and other objects and advantages of the invention are more fully described in the following specification taken in conjunction with the accompanying drawings in which:

FIG. 1 is an elevational cross section of a conveyor apparatus including an improved chain according to the instant invention;

FIG. 2 is a side elevation, partially sectioned, showing the embodiment of the chain of the instant invention;

Figure 3:
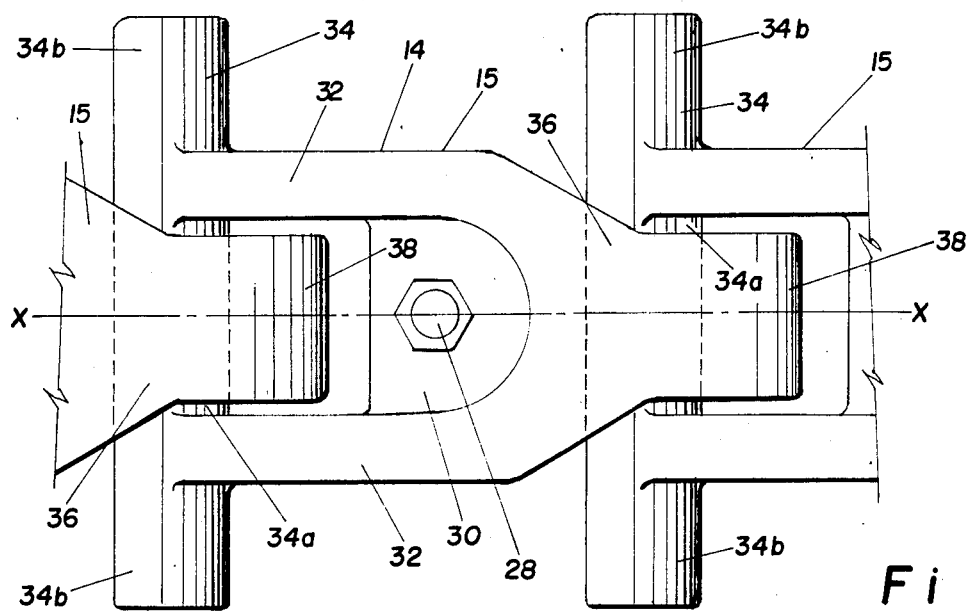
FIG. 3 is a plan view of the embodiment of FIG. 2.

There is generally indicated at 10 in FIG. 1 a conveying apparatus including a resiliently deformable conveying element in the form of an endless belt 12 having mounted centrally thereon and extending longitudinally thereof an endless chain 14 constructed according to the principles of the present invention. An upper or conveying run 12a of belt 12 is supported in a generally troughed configuration by plural support rollers 16, 18, 20 and 22 which are carried by any suitable conventional support frame, not shown. Edge rolls 24 and 26 are also provided to restrict side-to-side movement of the upper reach of belt 12. The cited but unillustrated support frame also carries a return idler roll 25 and edge rolls 28, 29 to support a lower or return run 12b of belt 12 in the conventional manner. Belt 12 is supported as described above by a plurality of longitudinally spaced frames (not shown), each carrying substantially identical sets of support rollers as described, and by terminal drums (not shown) located at opposite longitudinal ends of the conveying apparatus and around which the endless belt 12 passes whereby in operation belt 12 is retained for orbital movement in an endless path.

Inasmuch as the structure generally described above is known to those versed in the art, further detailed description thereof is believed unnecessary. The present invention relates to chain 14 and the combination thereof with elastically deformable belt 12 to provide an improved conveyor apparatus. Thus, on reference to FIGS. 2 and 3 it will be seen that chain 14 includes a plurality of substantially identical links 15, each of which includes a conveyor belt engaging surface 17 whereby the individual links 15 may be releasably secured to belt 12 as by a flathead bolt and nut assembly 28 which extends within a through bore formed in a securing lug portion 30 of each link 15 and through an aligned bolt hole 27 formed centrally of the lateral extent of belt 12 as shown. The head of bolt 28 may be recessed into hole 27 in a recess 31 to provide for a smoother overall belt surface and to minimize wear on the bolt head. Each chain link 15 comprises a substantially unitary structure having an axial or longitudinal extent along an axis X—X in the direction of the longitudinal extent of chain 14 (FIG. 3), and a lateral extent transverse of the longitudinal extent thereof.

The securing portion 30 is located longitudinally intermediate the forward and rearward ends of each link 15 and is formed laterally intermediate and integral with a pair of laterally spaced apart upstanding side or web portions 32 which extend longitudinally rearwardly from lug 30 to a transversely extending pivot axis means or crossbar 34. Crossbar 34 includes an intermediate portion 34a extending transversely of axis X—X intermediate webs 32 which is adapted for connection to a similar chain link 15 in a manner to be described hereinbelow, and a pair of outboard portions 34b preferably coaxial with portion 34a and extending laterally outwardly of webs 32. Portions 34b are formed as driving lugs to be engaged by a drive sprocket means (not shown) for the purpose of applying driving tension to chain 14 in a manner similar to that described in the hereinabove cited Becker application, whereby driving tension may be transmitted to the conveying element.

Forwardly of securing portion 30 the web portions 32 converge toward axis X—X to form an over-reaching hook portion 36 including a forwardly and downwardly projecting hook arm 38, as viewed in FIG. 2, which is adapted to engage in tension bearing engagement the intermediate crossbar portion 34a of the next successive such link 15 in chain 14. As will be seen, each hook portion 36 defines within the forward reach thereof a maximum span of dimension $d_1$ between forward and rearward interior points 39a, 39b therein which is greater than the diameter $d_2$ of the corresponding crossbar portion 34a to be engaged thereby. Accordingly, a predetermined longitudinal free play between each pair of connected links 15 is permitted. This allows a predetermined and limited longitudinal prestretch to be imposed upon the conveyor belt 12 upon installation of the chain and belt assembly on the conveyor support structure. Specifically, it will be noted that if spacing S between the axes of successive bolt holes 27 in the belt, when in its relaxed or unstretched state, is of a smaller dimension than that shown in FIG. 2 by an amount not exceeding the difference between $d_1$ and $d_2$, then upon assembly of links 15 to belt 12 each hook portion 36 of each link 15 will overly the crossbar portion 34a of the next successive link 15 with the crossbar portion 34a near or in abutment with the rearward end point 39b of the cooperating hook 36. Accordingly, upon installation of the chain and belt assembly on the conveyor support structure the span of belt 12 between successive bolts 28 may be extended by an amount limited to the difference between dimensions $d_1$ and $d_2$ thus prestretching the belt 12 a predetermined limited amount and bringing the crossbar portion 34a into engagement with the forward end 39a of the hook portion 38. This prestretching preferably will be in the range of approximately 10 percent, or more generally in the range defined in the specification of the above cited copending application of Hoover. Thus, in this instance the difference between $d_1$ and $d_2$ would preferably be approximately 10 percent of the span of the relaxed or unstretched belt between the centerline of successive bolts 28.

Figure 4:
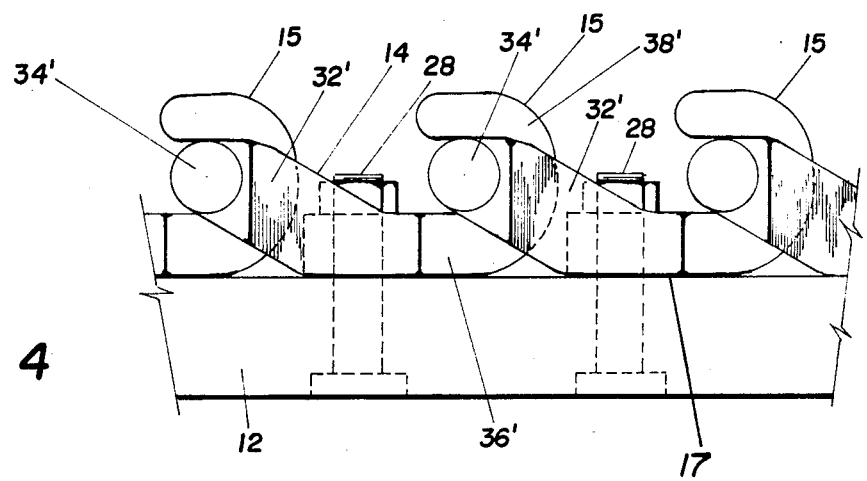
FIG. 4 is a side elevation showing an alternate embodiment of the instant invention.
Figure 5:
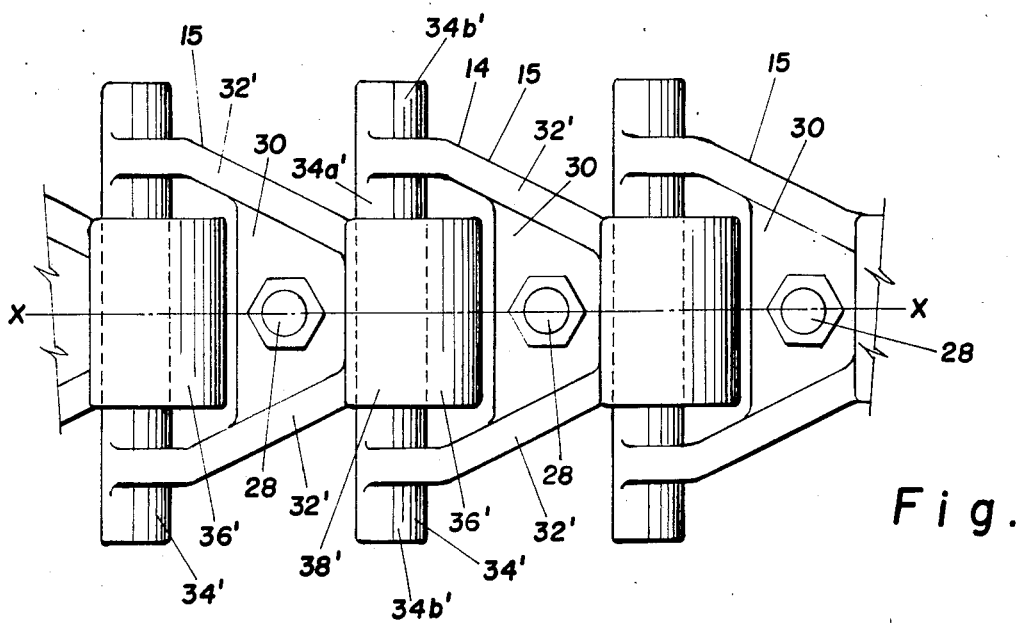
FIG. 5 is a plan view of the embodiment of FIG. 4.

In an alternate embodiment of the invention as shown in FIGS. 4 and 5, each chain link 15 includes a securing lug portion 30 for securing the link 15 to belt 12 by bolt and nut assemblies 28 as described hereinabove. In this embodiment laterally spaced apart web portions 32' diverge rearwardly to a laterally extending crossbar portion 34' having an intermediate portion 34a' and outboard sprocket engaging lug portions 34b' also substantially as described hereinabove. In the forward extent of this link 15 web portions 32' converge toward axis X—X to form a under-reaching hook portion 36' having a forwardly and upwardly extending arm 38' as viewed in FIG. 4 which is adapted to engage the intermediate crossbar portion 34a' of the next successive link 15. In this embodiment crossbar 34' will of course be spaced sufficiently from the surface of belt 12 to provide clearance for hook portion 38' extending therebetween. As in the embodiment of FIGS. 2 and 3, hook portion 36' accommodates a predetermined, limited free play between the connected links by permitting longitudinal forward and rearward movement of crossbar portions 34' therein between the seated position thereof as shown in FIG. 4 and a position wherein crossbar 34' would abut or be adjacent the associated nut and bolt assembly 28.

It is noted that in each embodiment an additional advantage is provided in that upon assembly of the chain 14 to belt 12, each crossbar portion 34a' may be effectively trapped or positively retained within the confines of the cooperating under-reaching or over-reaching hook portion. In the embodiment of FIGS. 4 and 5 the clearance between bolt 28 and the tip of hook arm 38' is less than necessary for passage of crossbar portion 34a' therebetween, whereas in the embodiment of FIGS. 2 and 3 the clearance between the tip of hook arm 38 and the belt is less than the diameter of crossbar portion 34a'. Inadvertent or undesired disconnection of the pair of connected links 15 is thus precluded. It is to be noted that it is highly desirable although not absolutely necessary that every link 15 be connected to the belt as shown rather than connecting only some of the links 15 to the belt. In an embodiment wherein only alternate links are connected to the belt, for example, the above described positive retention of the crossbar portion 34a' is not available for the nonconnected links unless, of course, additional structure such as a stud or bolt threaded or otherwise secured to lug portion 30 of such link is included.

According to the description hereinabove there is provided by the instant invention a new and improved tension chain for use in conjunction with a resiliently deformable conveyor belt to carry driving tension and to provide for a limited, predetermined prestretching of the belt and reduction of the prestretch in those portions of the belt passing over the terminal drums. The chain of the present invention additionally provides economies of manufacture in that all of the links are identical or substantially identical and may be readily manufactured as investment castings, for example. Furthermore, according to the present invention each such link preferably is secured to the belt thereby eliminating floating links. Among other features and advantages of the invention are improved ease of replacement of individual broken links and an improved driving structure by virtue of the intermediate hook-to-crossbar engagement and the outboard drive sprocket engagement of the driving lugs.

Notwithstanding the description hereinabove of particular preferred embodiments of the invention, the invention is amenable to various alternative embodiments and modifications without departing from the broad spirit and scope thereof. For example: mounting bolt assemblies 28 may be replaced by rivets or other suitable fasteners, or indeed by plural fasteners for each link; specific dimensions and proportions of the various described components of the chain links may be varied within a latitude of design; the outboard sprocket engaging lugs need not necessarily be coaxial with their corresponding intermediate crossbar portion; and the like. These and other embodiments and modifications having been envisioned and anticipated by the inventor, this invention should be construed as broadly as permitted by the scope of the claims appended hereto.

What is claimed is:

1. A conveyor belt comprising: an elongated web of resilient material; a chain having a plurality of links each of which is secured to a longitudinally extending portion of said web in longitudinally coextending relation with respect thereto, said chain adapted to cooperate with a drive means to transmit driving tension to said conveyor belt, each of said links including a substantially unitary link body defining a pair of longitudinally spaced apart connector portions and an intermediate portion extending longitudinally intemediate said spaced apart connector portions; said intermediate portion of said link bodies including a laterally intermediate securing portion cooperable with a securing means for securing said web adjacent said link bodies; one of said pair of connector portions of each said links being formed as an elongated connection means extending transversely of the longitudinal extent of each of said link bodies, said transversely extending connection means having outboard portions extension laterally outward of said link body, said outboard portion capable of engaging said drive means, the other said pair of connector portions of each of said links being engageable with one of said elongated connection means of an adjacent link for pivotal connection thereto and being positively retained with respect thereto only when tension is applied to said chain.

2. The chain as claimed in claim 1 wherein each of said pairs of connector portions is formed integrally with the respective said link body.

3. The chain as claimed in claim 2 wherein said elongated connection means includes a transversely extending pivot axis means.

4. The chain as claimed in claim 3 wherein each of said other connector portions includes a formed hook means which is cooperably engageable with said pivot axis means.

5. The chain as claimed in claim 4 wherein said hook means includes an over-reaching hook arm cooperably engagable with said pivot axis means to positively retain the respective said pivot axis means intermediate said hook arm and such conveying element secured to said chain.

6. The chain as claimed in claim 4 wherein said hook means includes an under-reaching hook arm extending intermediate said pivot axis means and such conveying element secured to said chain and engageable with said pivot axis means to positively retain said pivot axis means intermediate said hook arm and said securing means.

7. The chain as claimed in claim 1 wherein said links are identical links.

* * * * *